United States Patent [19]
Rich

[11] Patent Number: 5,327,509
[45] Date of Patent: Jul. 5, 1994

[54] COMPRESSED IMAGE SYSTEM FOR TEXTURE PATTERNS

[75] Inventor: Henry H. Rich, Raleigh, N.C.

[73] Assignee: Star Technologies, Inc., Sterling, Va.

[21] Appl. No.: 873,815

[22] Filed: Apr. 27, 1992

[51] Int. Cl.⁵ .............................................. G09B 9/08
[52] U.S. Cl. ........................................ 382/17; 395/128; 395/131; 395/126; 395/130
[58] Field of Search ............................. 382/16, 17, 56; 395/125, 126, 127, 130, 131, 121, 128; 358/104, 524, 525

[56] References Cited

U.S. PATENT DOCUMENTS

| | | | |
|---|---|---|---|
| 4,477,833 | 10/1984 | Clark et al. | 358/525 |
| 4,905,164 | 2/1990 | Chandler et al. | 395/131 |
| 5,222,204 | 6/1953 | Swanson | 295/127 |

Primary Examiner—David K. Moore
Assistant Examiner—Matthew C. Bella
Attorney, Agent, or Firm—Roy W. Latham; Douglas M. Clarkson

[57] ABSTRACT

The disclosure describes the use of an image generator connected to receive at least two, and preferably three, base colors that have been previously compressed using two blend factors to interpolate degrees of color intensity in a texture image. A decoder circuit to restore the compressed image color data for each data path from memory uses a color blender circuit to restore the color components from data from each path to produce that color at an output terminal. A provision is described for including translucency also.

10 Claims, 6 Drawing Sheets

COMPRESSED IMAGE SYSTEM FOR TEXTURE PATTERNS

BACKGROUND OF THE INVENTION

1. Field of the Invention

The present invention, generally, relates to image texture generators and, more particularly, to a new and improved system for handling texture patterns used with digital computer graphics.

Image generators are receiving ever widening use in industry today. One use is to produce imagery for real time training, such as, for example, in flight simulation apparatus. New uses are even in amusement apparatus.

Image generators produce perspective images from stored mathematical descriptions of objects, usually polygon approximations of shapes of real world objects. It has been found that a key to enhancing such imagery is to provide a capability of texturing for selected surfaces of the polygon objects, as a variation to what otherwise would be uniform appearances of these polygon surfaces.

An image generator will store a texture pattern in a local Random Access Memory (RAM) for fast access when needed for texturing selected surfaces. Texture patterns are in a two dimensional array of a sample of such a pattern, wherein each texture sample is called a "texel" and contains one or more parameters describing the texture at that point.

For example, a texel for a color image may have red, green and blue parameters. An image generator establishes a mathematical correspondence between the points of the displayed polygon (the pixels) and the texels of a stored texture pattern, so that the pattern appears attached to and a part of the polygon.

A color texture pattern may be applied to a modelled polygon object so the pattern appears attached in the manner of paint or wallpaper. For example, an insignia stored as a color texture pattern may be applied to an aircraft modelled by polygons.

A variety of different parameters may be stored in each texel. In addition to three color components, a translucency factor is included sometimes. The translucency factor is a number between zero and one that represents how transparent or how opaque the polygon surface should be rendered by such an image generator, ranging from completely transparent to completely opaque.

Varying the translucency factor along with color provides an effective way of modelling plant foliage effects and to provide windows in buildings. Smoke and cloud effects also are modelled effectively using a translucency parameter in texture.

Since most objects in the natural world have textured surfaces, realistic imagery requires that many texture patterns be stored in an image generator. This requires a great deal of high speed storage, which can become quite expensive.

For example, in military training situations, it is highly desirable to store and use images from satellites or aerial photography as texture patterns, so that the terrain from the image generator will appear as much as possible like the terrain of the real world. A resolution of one foot in a ground image requires more than 25 million texels per square mile.

Traditionally, five to eight bits have been used for each color component and for the translucency factor. Thus, about 50 to 75 million bytes of data are required per square mile of terrain, and proportionately, more bytes than this are required for patterns using translucency.

Storage of these data clearly places a cost burden on RAM storage in the image generator that is required for real time texturing of polygons in a view. For large areas, required for military exercises, it also places a burden on data storage requirements and retrieval rates. Therefore, there are cost and engineering incentives to minimize the data storage requirements for the texture data.

Several image data compression schemes are known, but heretofore, none of these have been found suitable for dealing with the problem of compressing texture patterns. Traditional compression schemes take advantage of the commonalities between neighbors in the arrays of values to be compressed, and they also take advantage of the general need to compress and restore a whole image at once.

Because a textured polygon may be viewed from any angle and be partially occluded, texel values may be accessed from part of the texture pattern at any time. Therefore, traditional schemes using the whole image cannot be used. Moreover, since the image is required to keep up with high resolution real time video, the decompression hardware must be kept simple.

In fact, common texture implementations require the retrieval of four to eight texels concurrently, so that an output value can be derived by interpolation. This puts additional pressure on any decompression scheme for texture patterns to work effectively.

OBJECTS AND SUMMARY OF THE INVENTION

Accordingly, it is an important object of the present invention to provide a means for reducing the storage required for color texture patterns.

It is also an object of the invention to provide a texture pattern compression system that is fast, so that it can keep up with real time image generation.

A further object of the invention is to provide texture pattern compression and decompression systems that are simple and economical to implement.

Briefly, a system arranged in accordance with the present invention includes means to convert three texture base colors in each texture pattern into a primary blend factor and a secondary blend factor. Means to store the blend factors make them available in restoring the color components for each individual texel.

This means to store the blend factors is connected to a table for partitioning the blend factors according to predetermined leading bits for indicating the transparency. The bits remaining in each byte are partitioned into two numbers, one for each blend factor.

The above and other objects, features and advantages of the present invention will become apparent from the following detailed description of the presently preferred embodiment.

BRIEF DESCRIPTION OF THE DRAWINGS

The present invention will be described with reference to the accompanying drawings, in which.

DETAILED DESCRIPTION OF THE INVENTION

Definitions

The following definitions are standard and well known in the field of the invention, and they are repeated now only for clarity and emphasis:

Pixel - a point in an array, usually on a visual display, but used in the description to define also the data stored to define that point.

Texel - a point in an array, usually stored in memory, defined by data sufficient to represent a texture pattern also.

Storing blend factors rather than the original red, blue, and green color components takes fewer bits because the blend factors take advantage of texture images using only a limited range of colors. For example, aerial or satellite photos of terrain use only a small part of the full range from dark to light values and do not contain significant amounts of fully saturated colors.

Consequently, choosing texture pattern primary colors of red, blue and green will permit coverage of the total spectrum of the pattern that is used. It has been found that virtually every texture image encountered can be represented with adequate fidelity using two blend factors to interpolate among these selected three base colors.

When there is no translucency, the texel is given a fixed format with bits allocated to the primary and to the secondary blend factors. Typically, an eight bit texel will have five bits allocated to the primary blend factor and three bits to the secondary blend factor. The primary blend factor is associated with the base color that tends to predominate in the image.

When the pattern contains translucency, fewer bits are needed to adequately represent the blend factors that yield the color. When a surface becomes nearly completely transparent, the surface color only appears as a trace combined with the background, so there is no need to represent the color with great accuracy.

The present invention takes advantage of the reduced accuracy requirement by assigning fewer bits to represent the blend factor as the amount of transparency increases. Specifically, the presence of transparency is indicated by having one or more leading zeroes in the texel storage.

The number of leading zeroes is used to look up the transparency factor for the particular texture pattern; the more leading zeroes, the greater the translucency factor. The bits remaining in the texel after the leading zeroes are used for storage of the two blend factors. The bits remaining are partitioned into two numbers, one for each blend factor.

The partitioning for the two blend factors is obtained from a table according to the number of leading zeroes. Accordingly, the encoding and decoding scheme adapts the required color precision to the level of translucency.

The texel decoder is implemented on an integrated circuit using well established gate array technology. The number of gates required and the processing speed are both well within the bounds of current technology. Therefore, implementation of the system of the invention is compact and efficient.

Figure 1:
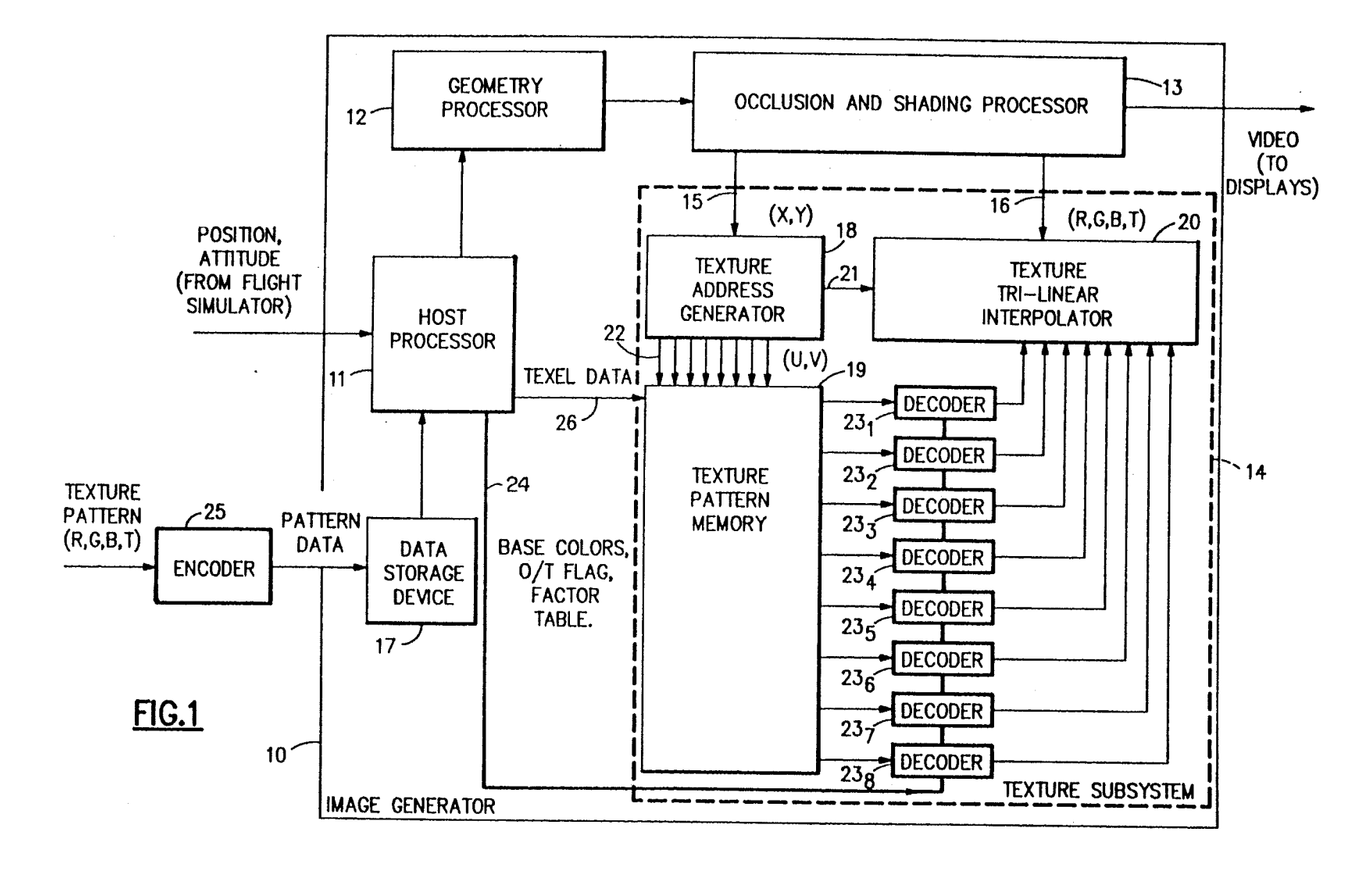
FIG. 1 is a block diagram showing the relationship of the texture image compression and texture image decoder system according to the invention in relationship to the image generator.

FIG. 1 shows an image generator 10 of the type used in a flight simulation apparatus. The image generator has a host processor 11 which includes its own computer, a geometry processor 12 and an occlusion and shading processor 13 that interconnects with a texture subsystem 14 over lines 15 and 16. Data describing the objects and texture patterns to be rendered in real time are prepared off-line and stored in a data storage device 17.

The texture subsystem 14 includes three major functional subdivisions: a texture address generator 18, a texture pattern memory 19, and a texture tri-linear interpolator 20. The texture address generator 18 receives from the occlusion and shading processor 13 over a connection 15 the address [x,y] for a pixel requiring texture.

The address generator 18, in turn, provides eight addresses in the texture coordinate system. The fractional values of the texture addresses are passed over a connection 21 to the tri-linear interpolator 20.

The integer portions of the texture addresses are passed over bus connections 22 to the texture pattern memory 19. The texture pattern memory 19 has texel data previously loaded over connection 26 by host processor 11 from the data storage 17.

Eight texel values are retrieved from the texture pattern memory 19. The retrieved texel values are connected directly to the tri-linear interpolator 20, but with the present invention, the texel data is compressed and is passed through eight identical decoder circuits $23_1$ through $23_8$ to restore it to its color component format.

The number of the decoder circuits is eight in the arrangement being described only because there are 8 inputs to the tri-linear interpolator retrieved concurrently in this illustration. Finally, the tri-linear interpolator 20 provides the color and translucency of the surface that corresponds to the original pixel address [x,y].

Each of the the decoder circuits, according to the present invention, requires (1) data for three basic colors, (2) an opaque/transparent flag [O/T flag], and (3) a factor table. The data for the colors is selected prior to the start of a texture pattern, and preferably, it is retrieved from the data storage 17 by the host processor 11 and sent over a connection bus 24 for the decoder circuits $23_1$ through $23_8$.

A modification can provide this data readily through graphics, polygon and other data from the host processor 11, to the geometry processor 12, to the occlusion and shading processor 13 and, from there, downloaded to the decoder circuits $23_1$–$23_8$. To be compatible with the decoding, texel data must be compressed into the correct format. Encoding is done off-line by an encoder 25 that processes the texture pattern data before storage in the device 17.

When the image generator 10 is initialized for use, the host processor 11 retrieves the pattern data from the data storage device 17 and loads it over a connection 26 to the texture pattern memory 19.

Without the encoder 25 and decoder circuits $23_1$–$23_8$, image generators with different forms of texture subsystems are known in the art. Image generators such as the Star-Graphicon GT2000, the General Electric CompuScene (TM) series and the Link Division MODDIG are examples of commercial products having differing architectural features that are not relevant to the present invention, because they differ significantly.

For the decoder circuits $23_1$–$23_8$ to function effectively, according to the invention, the texture pattern data must be encoded properly. That is, proper encoding will be described in detail beginning with the following description of its operation.

Figure 2:
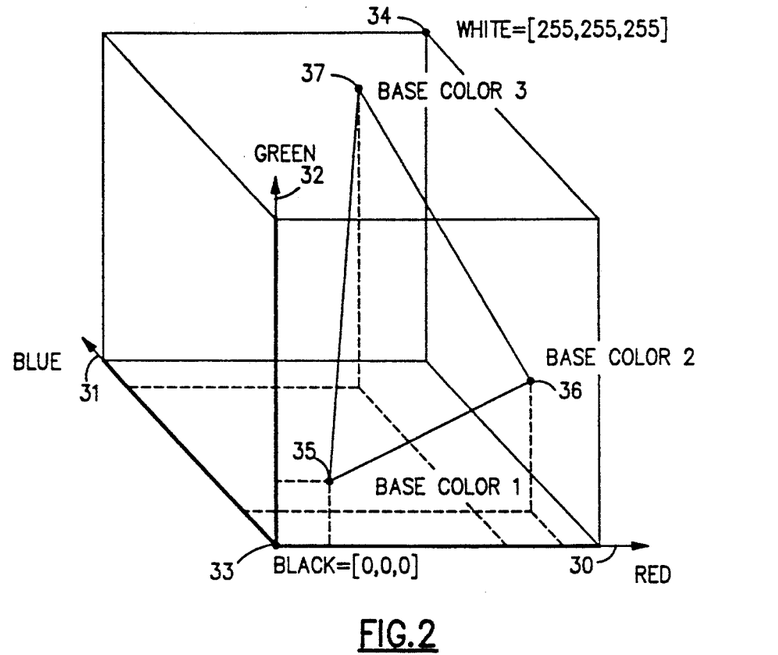
FIG. 2 is an illustration of three colors in a space diagram as an aid in describing the invention.

A color that can be recognized by a human eye can be specified by three numbers corresponding to coordinate values of any one of several different color spaces. A simple color space is the color cube that is illustrated in FIG. 2 as an aid in the following description.

The color space illustrated is of the three colors used in digital systems for display on a color display device, such as a color Cathode Ray Tube. The three axes of the cube correspond to the intensity of the colors red 30, blue 31, and green 32 channels of the display.

In a digital representation, the intensities are scaled from 0 to 255 for each color, to represent the brightness range of a display device, thereby defining a cube in the color space. All of the colors that can be displayed by the display device correspond to points in the space within the cube. Black is at the origin 33, and white is the point 34, diagonally opposite black.

This color space representation is generally suitable for the image generator 10 since it describes the range of colors to be produced by the system of the invention. Therefore, each color is represented by three color components, and in this illustration, the color components are red, blue and green with each an integer scaled from 0 to 255.

The color space representation of the present invention, as described hereinabove with the red, green, blue color space, is applicable for use with other color spaces also.

Practical texture patterns, i.e., patterns of texture as a practical matter, do not use all the colors represented in the color space. Therefore, in accordance with the invention, by reducing the number of potential colors that have to be stored, the requirements for a storage space are reduced dramatically.

An extreme reduction is to consider only the colors that are on a line segment in the color cube, which requires the use of only a single "blend factor" as a texture pattern parameter. However, the present invention provides a substantial improvement over this by providing a second blend factor.

For example, in FIG. 2, select a base color 1, at a point 35, a second base color 2, at a point 36, and a third base color 3, at a point 37, which defines a triangle within the color cube. The colors on the surface of the triangle are still a small subset of the whole cube, but nevertheless, the triangle represents a much larger gamut than is available from prior systems.

Figure 3:
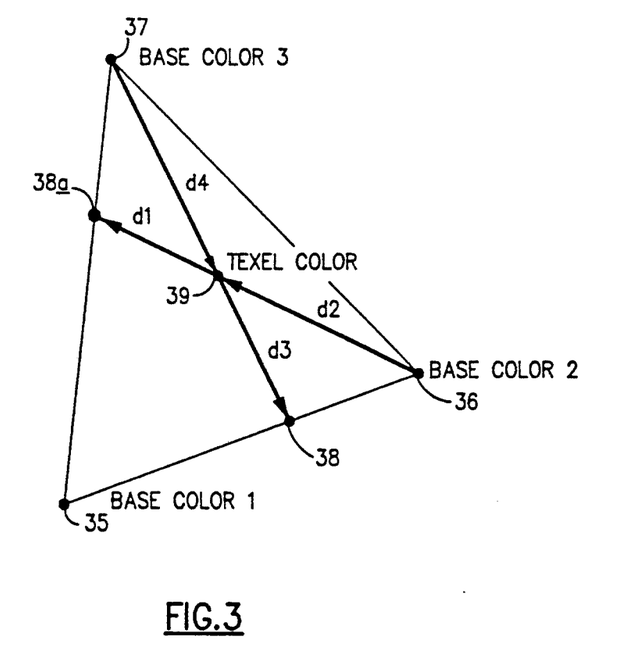
FIG. 3 is an illustration showing how blend factors are derived and used in interpolating a color in accordance with the present invention.

FIG. 3 is a view of only this triangle, developed above, and the triangle shows how any color within the triangle can be obtained by the use of only two "blend factors". A first blend factor, the "primary blend factor", expresses the proximity of the color, point 39, to the base color 2, point 36.

A secondary blend factor expresses the proximity of the color, point 39, to the base color 3, point 37. As long as the color, point 39, is within the triangle, the blend factors will be between 0 and 1, and their sum will be between 0 and 1. This technique can be used also to encode colors whose blend factors are between 0 and 1 but whose sum is greater than 1; these colors are within a rhombus defined by the two edges 38 and 38a.

In terms of distance along each of the lines, the blend factor 1 is defined also by the expression:

$$\text{Blend Factor 1} = \frac{d1}{(d1 + d2)} \quad (1)$$

where d1 and d2 are defined in FIG. 3, and the blend factor 2 is defined also by the expression:

$$\text{Blend Factor 2} = \frac{d3}{(d3 + d4)} \quad (2)$$

where d3 and d4 are defined in FIG. 3.

The gamut of colors available using three base colors with two blend factors is a material departure from prior efforts to provide texture patterns with a high degree of realism and is adequate for virtually every required texture pattern. It has been found useful to use the primary blend factor with the more common two of the three base colors, which permits more bits to be stored for the primary blend factor than for the secondary.

A compressed image system in accordance with the invention permits transparency to be included readily in the encoding scheme. However, a significant consideration is that as the transparency of a surface increases, the accuracy of the representation of color for the surface can decrease, but this can be provided for in the encoder, according to the invention.

When a surface is completely transparent, its having a color does not apply; all that can be seen is the color of the object behind the completely transparent surface, and no bits are required for storage of a color pattern. When the surface is highly transparent but not completely transparent, the color of the texture pattern will add only a small tint to the background color seen through the surface.

Consequently, the accuracy of the color pattern is not critical to an acceptable rendition. In general, the more transparent the surface, fewer are the bits needed to be devoted to the blend factors in order to reconstruct a color.

Encoding in accordance with the invention takes advantage of this characteristic by using leading zeroes in an encoded texel to signify the transparency factor for that texel. The relationship between these zeroes and the transparency is established by a "Factor Table" that is predetermined manually for each texture pattern.

The Factor Table tabulates for each case from no leading zeroes to eight leading zeroes, for a texel of eight bits, the transparency factor that corresponds to each case. For eight leading zeroes, i.e., for all zeroes in the byte, the transparency factor is one, which means that the surface is completely transparent at that texel.

For the above example, no bits are assigned to the blend factor. The Factor Tables also includes, for each case, the number of bits in the primary blend factor "N".

An example of a Factor Table is as follows:

FACTOR TABLE

| No. of leading 0's | transparency factor | "N" |
|---|---|---|
| 0 | 0 | 5 |
| 1 | 0.0625 | 4 |
| 2 | 0.125 | 4 |
| 3 | 0.25 | 3 |
| 4 | 0.50 | 2 |
| 5 | 0.75 | 2 |
| 6 | 0.8725 | 1 |
| 7 | 0.9375 | 1 |
| 8 | 1.00 | 0 |

Figure 4:
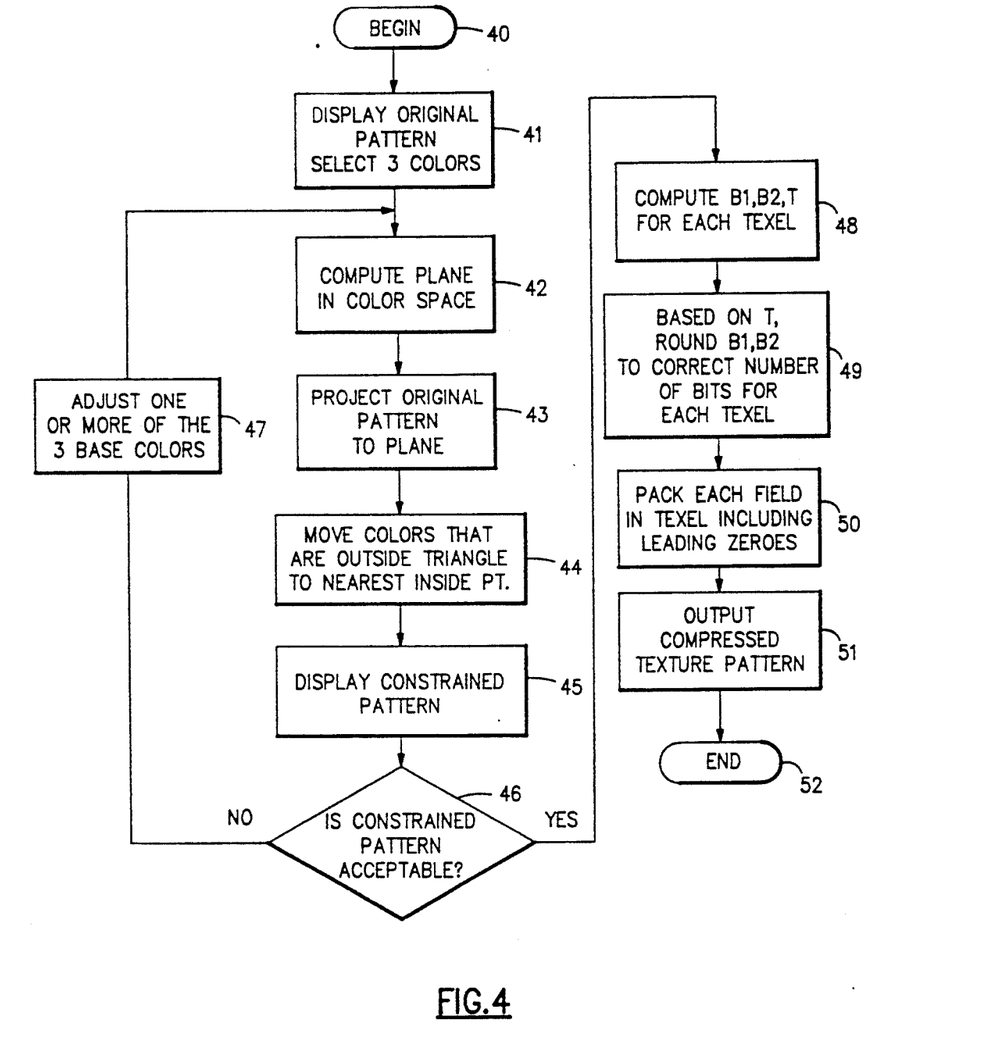
FIG. 4 is a flow chart as an aid in describing the compression portion of a color texture system according to the present invention.

Referring to FIG. 4, the encoder is presented as a flow chart. The encoding is implemented, according to the invention, by following these steps on a color display.

The encoding process begins with an original texture pattern to be compressed, illustrated by block 40. The original pattern is displayed, and three base colors are selected manually by an operator for use in the compression, block 41.

Next, block 42, a plane is fitted to the three base colors that correspond to the plane of the triangle defined by the three base colors 35, 36 and 37, described in connection with the color cube of FIG. 2. All of the texels of the original pattern are projected now into this plane, block 43.

Some of the projected texel colors may be outside of the triangle formed by the base colors, and so, these are moved to the closest points on the edge of the triangle, block 44. This reduces the color space to that which can be represented by the three base colors, forming a "constrained pattern."

Next, the constrained pattern is displayed, block 45, and the operator now must decide whether it is acceptable, block 46. If the colors of the constrained pattern as displayed are not acceptable, the operator initiates an adjustment procedure, block 47.

During this adjustment procedure, block 47, the operator alters the intensity of one or more of the base colors in an effort to find a better fit to the texel data. When at least one of the base colors is altered, the plane computation of block 42 is repeated.

After a new constrained version of the original pattern is accepted, it is displayed, block 45. When the operator decides the pattern is acceptable and can provide a "yes" answer to the question of block 46, only then does the operator proceed to the final encoding process, block 48.

During the final encoding process, block 48, the primary and secondary blend factors are provided for each texel according to the distance of each texel from the base colors, as described previously. The blend factors then are rounded to the appropriate number of bits, block 49, according to the factor table that has been predetermined.

If transparency is included in the pattern, it will be used to select the packing partitions from the factor table. If there is no transparency in the entire pattern, the opaque/transparent (O/T) flag is set for the texture pattern.

Now, the fields in each texel are filled in, including any leading zeroes for transparency, block 50, and the whole pattern is stored, typically on disk or tape, block 51. The encoding procedure now is complete, block 52.

A simplification of the decoding hardware is obtained by a modification in the above described procedure by reversing the bits in the secondary blend factor from left to right before packing them into the texel. Also, the compressed pattern can be displayed after rounding the factors, which involves a repeat of the adjustment step of block 47 from the block 49, if desired.

Figure 5:
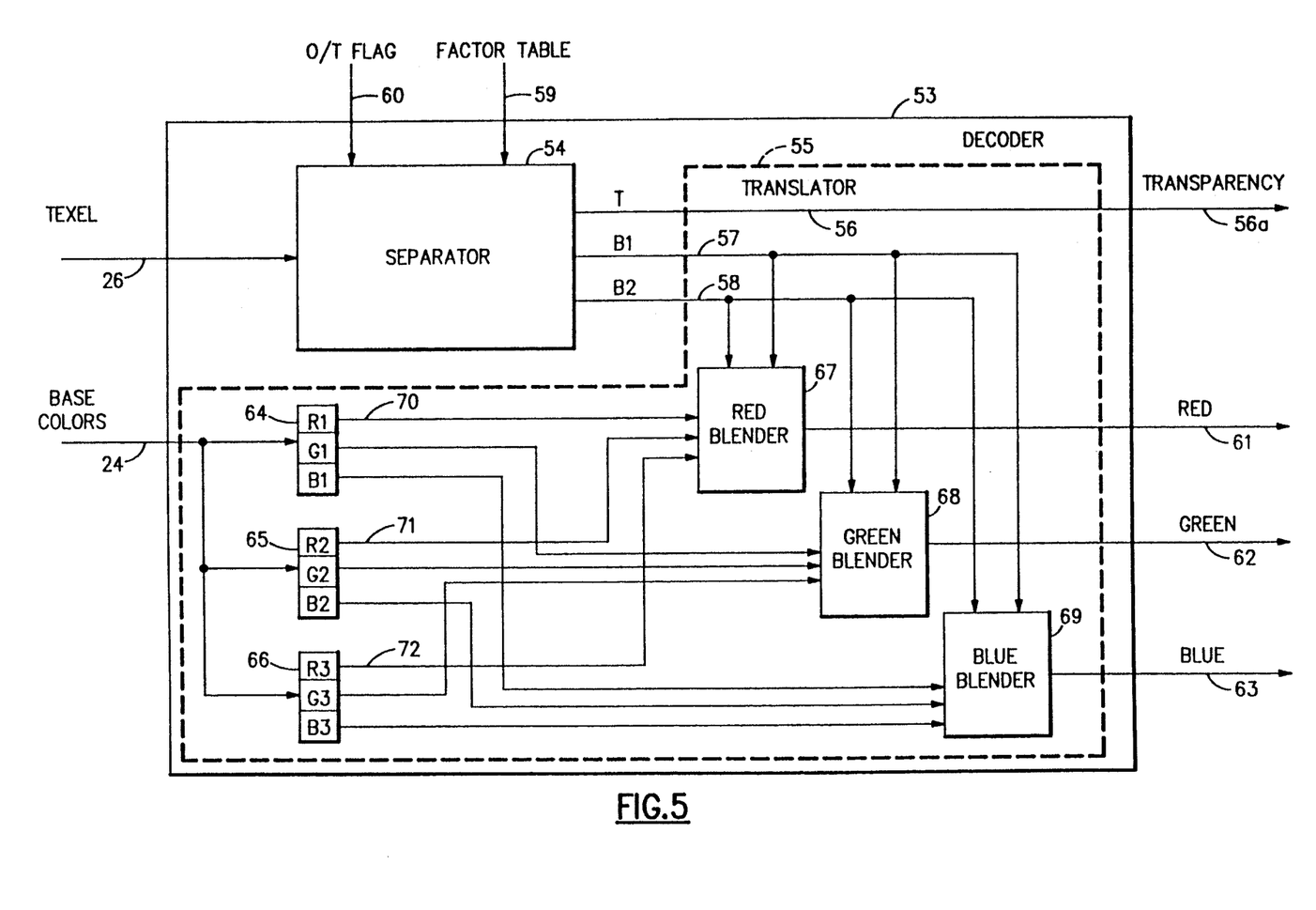
FIG. 5 is a block diagram of the compression decoder portion showing decoder partitioning into two stages and showing the use of blenders in a translator stage.

In FIG. 5, a decoder circuit 53 is illustrated that is typical of each of the decoder circuits $23_1-23_8$ of FIG. 1. The decoder circuit 53 has a separator 54 and a translator 55.

The separator 54 recovers the transparency factor 56, the primary blend factor 57 and the secondary blend factor 58 from incoming texel data on connection 26, FIG. 1, using previously downloaded factor table 59 and the O/T flag 60 from the host processor 11 over the connection 24, FIG. 1.

The translator 55 connects the transparency factor 56 to an output terminal 56a and converts the blend factors 57 and 58 into the color components red, green and blue at output terminals 61, 62 and 63, respectively, using the base colors 64 connected from the host processor 11 over the bus 24, FIG. 1. Details of the translator 55 part of the decoder 53 are shown also in this FIG. 5 within the broken line block. The three base colors are identified by the numerals 1, 2, and 3 and are selected and stored in three registers 64, 65 and 66, respectively, prior to use of a specific texture pattern.

The base colors 1, 2 and 3, identified also in FIG. 3, remain stored in the registers 64, 65 and 66, FIG. 5, until overwritten by a new set of base colors selected for a new pattern. A modification to speed processing may include a local register file of base colors to facilitate color switching for different patterns, but this is not necessary for the invention.

Each base color consists of red, green and blue color components, each color component having eight bits. The color components are combined using the blend factors 57 and 58 with identical hardware in a red blender 67, a green blender 68, and a blue blender 69.

For example, the red component 70 of base color 1, the red component 71 of base color 2, and the red component 72 of base color 3 are each connected to the red blender 67. The green and blue components of the base colors in the registers 64, 65 and 66 are handled in an same manner.

Figure 6:
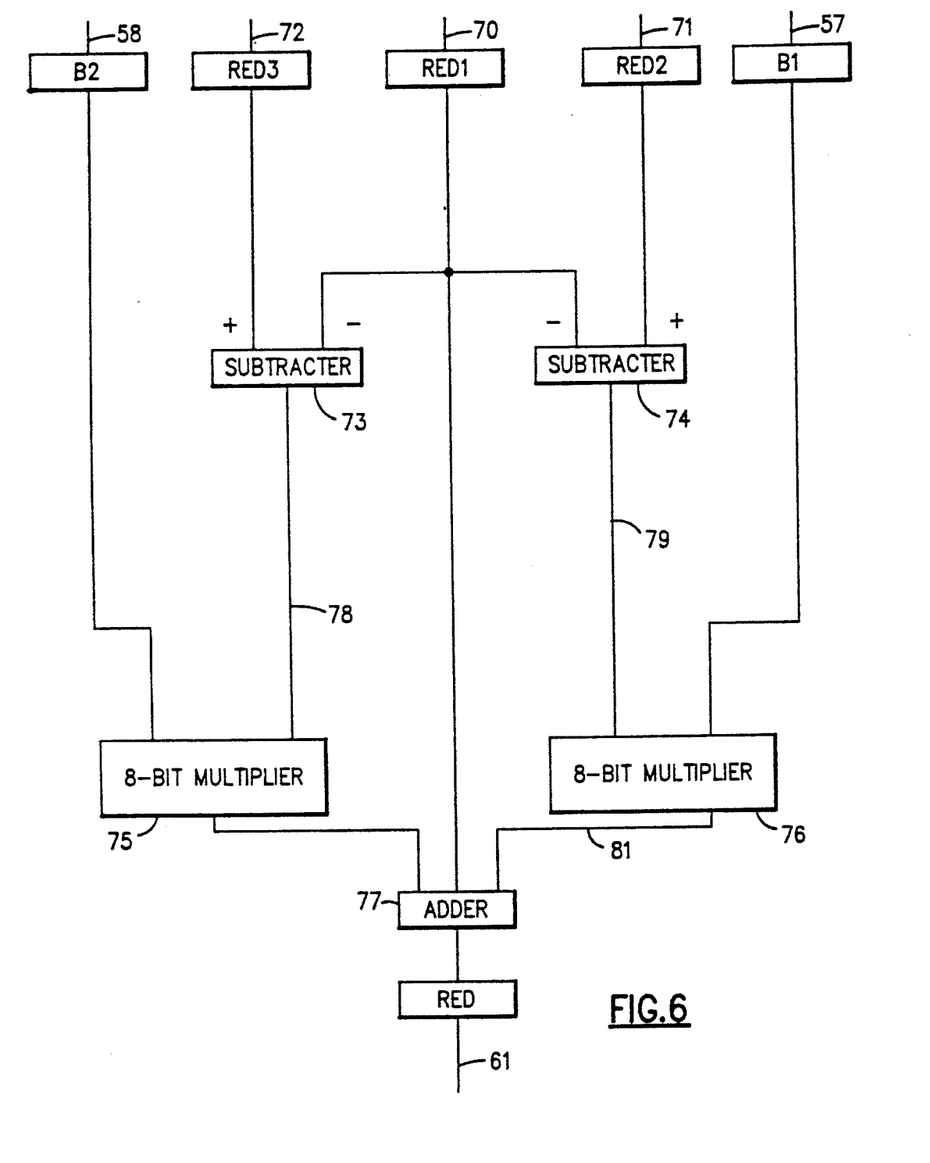
FIG. 6 is a more detailed block diagram, as an aid in describing the invention, illustrating the red color blender as typical of the three color components in the translator stage.

A block diagram of the red blender 67 is shown in FIG. 6. The green blender 68 and the blue blender 69 are identical functionally. Each blender applies the blend factors as shown diagrammatically in FIG. 3.

Referring to FIG. 6, an 8-bit subtractor 74 computes the difference between the base color 2, from connection 71, and the base color 1, from connection 1, to yield (RED2-RED1) on a connection 79. This result on connection 78 is connected to an 8-bit multiplier 76, which takes as its other input the blend factor 1, from connection 57. The output of the multiplier 76 is placed on connection 81 and contains the value B1*(RED2-RED1).

Similarly, an 8-bit subtractor 73 computes the difference between the base color 3, from connection 72, and the base color 1, from connection 70, to yield (RED3-RED1) on a connection 78. This result on connection 78 is connected to an 8-bit multiplier 75, which takes as its other input the blend factor 2, from connection 58. The output of the multiplier 75 is placed on connection 80 and contains the value B2*(RED3-RED1).

An 8-bit adder 77 adds the base color 1, from connection 70, the value B1*(RED2-RED1) from connection 81, and the value B2*(RED3-RED1) from connection 80, to provide the overall pixel value

REDI=RED1+B1*(RED2-RED1)+B2*(RED3-RED1)

which is placed on connection 61.

As illustrated in FIG. 3, the application of the factors to all three color components yields the texel color 39 from the base colors 35, 36 and 37. The result is the fully decoded red color output on connection 61, in FIG. 6.

Figure 7:
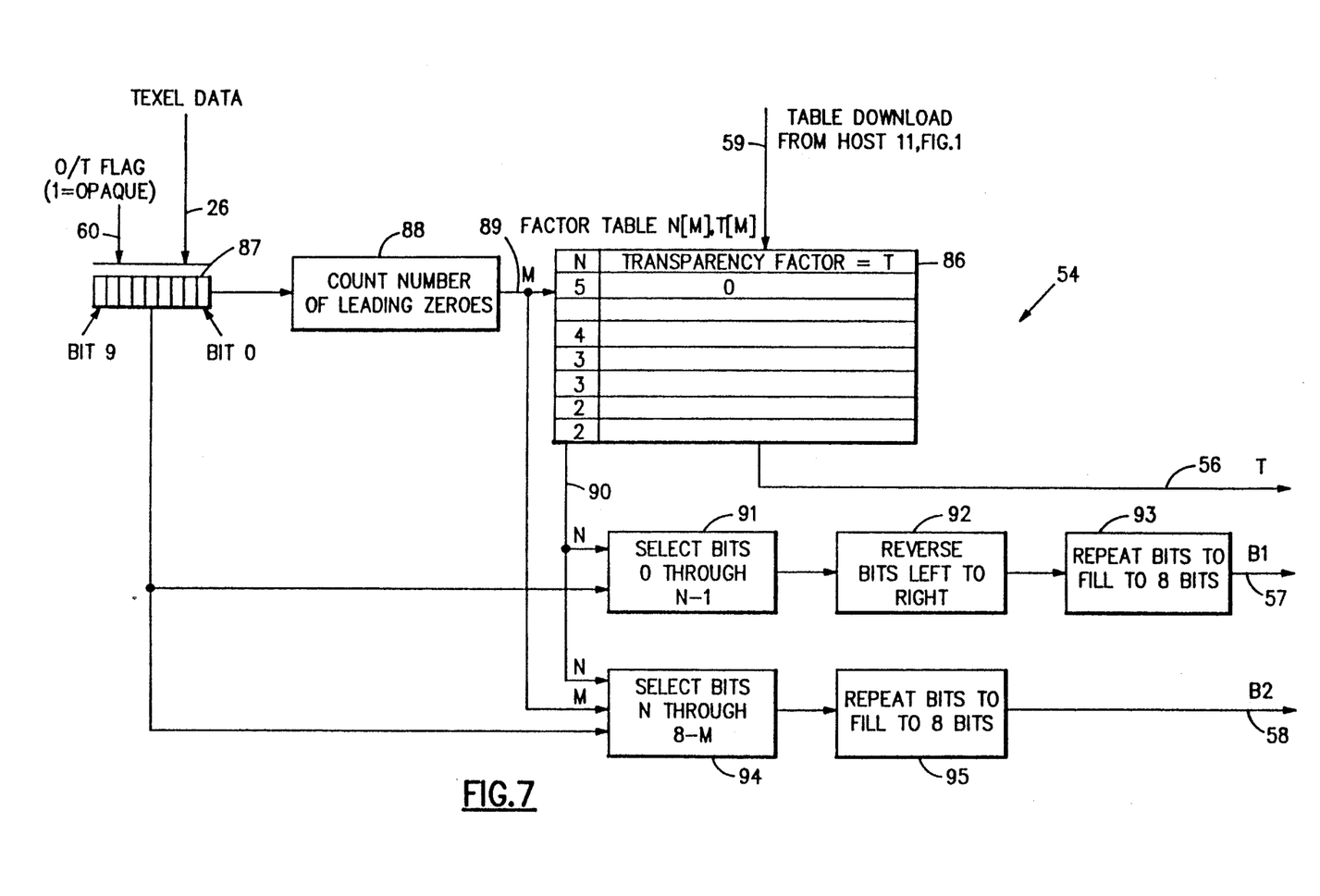
FIG. 7 is a detailed block diagram as an aid in describing the separator stage of the compression decoder portion of the present invention.

FIG. 7 is a diagram illustrating the separator 54 stage of the decoder 53. The separator receives texel data on the connection 26 and outputs eight bit values for the transparency factor 56, the primary blend factor 57 and the secondary blend factor 58.

If a new texture pattern requires a change in the factor table data on the connection 59 or the O/T flag data on the connection 60, it is downloaded from the host 11, in FIG. 1. The factor table data is stored in local random access memory 86, and the O/T flag data is stored as the most significant bit of a nine-bit register 87, while texel data is loaded into the least significant eight-bits of this nine-bit register 87.

The texel data with a flag prefix is connected to a counting logic circuit 88, which counts the number of leading zeroes in the word and provides the count "M" on a line 89 as an address for the local factor table 86. One output of the local factor table 86 is the predetermined eight-bit transparency factor 56.

The other output 90 from the local factor table 86 is the number of bits in the primary blend factor, "N". A logic select circuit 91 selects the N least significant bits of the texel data from the register 87.

These least significant bits were reversed from left to right when packed into the texel, and now, they are reversed back to their original order by a bit reversal logic circuit 92, which is just a redefinition of the wiring order. The bit reversal simplifies filling the output reconstruction of the eight bits of the blend factor by a logic circuit 93.

The eight bits of the blend factor output 57 are filled by the logic circuit 93 by repeating the N bits that were recovered from the texel data. For example, if N=3 and the three bits in the texel are 011, these would be reversed to 110 and repeated as 11011011.

The bit-repetitive filling is necessary to preserve the same dynamic range of the data despite having stored different number of bits. Thus, for example, 111 and 1111 are both expanded to the full scale value of 11111111 as they should be.

Bit reversal simplifies the implementation of this process by allowing the least significant bit of the texel data to be permanently connected to the most significant bit of the output, thereby saving a shift operation.

The shift operation is still required for the secondary blend factor. This step can be avoided by a straightforward extension of this technique, by rearranging the bits received by the zero-counting block 88 so that zeroes were detected on middle bits.

With such a modification, the most significant bit of the secondary blend factor can be permanently connected to the most significant bit of the texel data, thereby saving a shift operation. The rearrangement of bits can be either permanent or controlled by a programmable selector.

The secondary blend factor is recovered by a select logic circuit 94 that selects bits N through 8 - M from the texel data in the register 87. These bits are passed as the most significant bits of the output to a logic circuit 95 that performs bit-repetitive filling identical to logic circuit 93. The result is the secondary blend factor on connection 58.

Implementation of all the decoder logic is done preferably using digital logic on any number of integrated circuits, the partitioning depending upon compatibility with the texture subsystem arrangement as a whole. The standard integrated circuit products available from LSI Logic, Inc. are entirely satisfactory in an implementation of the invention.

In other integrated circuit arrangements, it is a common practice to use minimized logic circuits to implement many functions. A minimized logic circuit is created by specifying or tabulating the required inputs and outputs, but then, the detailed combination of gates that implement the functions best, within the constraints of the selected integrated circuits, are determined automatically by known computation procedures.

These procedures are preferred for implementing most of the logic circuits in the present invention. Using minimized logic circuits is well within the ordinary skills of this art to implement the specific circuit components based upon the preceding description.

Having presented hereinabove and in the accompanying drawings a complete description of the presently preferred embodiment of the invention, it will be apparent to those skilled in this art that modifications and changes can be made, but it is understood that all such modifications and changes that come within the spirit and scope of the appended claims are within the present invention.

What is claimed is:

1. A compressed image system for texture patterns, having:

image generator means including means for storing digital data representative of a first base color, a second base color, and a third base color;

said image generator means also having texture memory means for storing texel data in bytes of a predetermined number of bits;

said image generator means also having data processor means for storing blend factor data in each byte of said texel data; and the improvement comprising:

texel decoder circuit means for restoring compressed color components of a texture pattern, comprising:

circuit means to receive said digital data representative of said base colors;

means to store digital data in a predetermined compressed format with at least two base colors and two blend factors consisting of a primary blend factor and a secondary blend factor;

separator circuit means for recovering transparency factor data including primary blend factor data and secondary blend factor data;

translator circuit means connected to receive said blend factor data for recovering texel color;

primary interpolator circuit means to combine data representative of said first base color and said second base color to produce data indicative of an intermediate color from the relationship $$\frac{d1}{d1 + d2}$$

where d1 and d2 are defined in FIG. 3; and
secondary interpolator circuit means to combine data representative of said third base color and said intermediate color from the relationship $$\frac{d3}{d3 + d4}$$

where d3 and d4 are defined in FIG. 3; whereby the color component is restored.

2. A compressed image system as defined by claim 1 wherein said improvement includes said texture memory means for storing blend factor data that is characterized as being a predetermined fraction of a distance from a first base color to a second base color, as defined in FIG. 3.

3. A compressed image system as defined by claim 1 wherein said improvement includes said texture memory means adapted to store texel data in bytes with selected bits representing translucency.

4. A compressed image system as defined by claim 1 wherein said improvement includes said texture memory means having both means to store blend factor data that is characterized as being a predetermined fraction of a distance between a first base color and a second base color, as defined in FIG. 3, and means to store texel data in bytes with selected bits representing translucency.

5. A compressed image system as defined by claim 1 wherein said improvement includes data processor means having means to store a factor table of predetermined values partitioning the bits remaining in each byte after translucency between two numbers, each representing color.

6. A compressed image system as defined by claim 1 wherein said improvement includes texel decoder circuit means with means for receiving texel data and base color data from said image generator means.

7. A compressed image system having texture memory as defined by claim 1 wherein said texture memory has multiple data paths for reading data, and said improvement includes a separate texel decoder circuit means, the number of said texel decoder circuit means being at least equal to the number of data paths from the texture memory, with a decoder means for each data path.

8. A compressed image system as defined by claim 1 wherein said improvement includes data processor means having means to store a factor table of predetermined values determining a partitioning of said bits in each byte between primary and secondary blend factors, and texel decoder circuit means for receiving both texel and base color data.

9. A compressed image system as defined by claim 1 wherein said improvement includes separate texel decoder circuit means for each texel to be processed simultaneously.

10. A compressed image system as defined by claim 1 wherein said data processor means includes means for storing blend factor table data for partitioning said bits in a predetermined manner.

* * * * *